United States Patent
Matsumoto et al.

(10) Patent No.: US 11,644,604 B2
(45) Date of Patent: May 9, 2023

(54) OPTICAL FILM, POLARIZING PLATE, AND IMAGE DISPLAY DEVICE

(71) Applicant: FUJIFILM Corporation, Tokyo (JP)

(72) Inventors: Ayako Matsumoto, Kanagawa (JP); Shuntaro Ibuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1093 days.

(21) Appl. No.: 16/130,327

(22) Filed: Sep. 13, 2018

(65) Prior Publication Data

US 2019/0011607 A1    Jan. 10, 2019

Related U.S. Application Data

(63) Continuation of application No. PCT/JP2017/011053, filed on Mar. 17, 2017.

(30) Foreign Application Priority Data

Mar. 25, 2016    (JP) .............................. JP2016-062131

(51) Int. Cl.
    G02B 5/30        (2006.01)
    G02F 1/1335      (2006.01)
    B32B 27/18       (2006.01)
    B32B 27/34       (2006.01)
    B32B 7/023       (2019.01)
    G02B 1/14        (2015.01)
    F21V 8/00        (2006.01)

(52) U.S. Cl.
    CPC .............. *G02B 5/305* (2013.01); *B32B 7/023* (2019.01); *B32B 27/18* (2013.01); *B32B 27/34* (2013.01); *G02B 1/14* (2015.01); *G02B 5/30* (2013.01); *G02B 5/3033* (2013.01); *G02B 6/0026* (2013.01); *G02B 6/0056* (2013.01); *G02F 1/1335* (2013.01); *B32B 2307/418* (2013.01); *B32B 2307/42* (2013.01); *B32B 2457/20* (2013.01)

(58) Field of Classification Search
    None
    See application file for complete search history.

(56) References Cited

U.S. PATENT DOCUMENTS

| | | | | |
|---|---|---|---|---|
| 2006/0217521 | A1* | 9/2006 | Angiolini | C08G 63/193 528/308 |
| 2006/0257512 | A1* | 11/2006 | Angiolini | C08G 63/193 425/45 |
| 2007/0243364 | A1* | 10/2007 | Maekawa | C08L 33/064 524/110 |
| 2012/0082863 | A1 | 4/2012 | Ohta et al. | |
| 2012/0327511 | A1 | 12/2012 | Murakami et al. | |
| 2013/0289203 | A1* | 10/2013 | Nishimura | G02B 1/04 524/612 |
| 2017/0276840 | A1 | 9/2017 | Horio et al. | |

FOREIGN PATENT DOCUMENTS

| | | | | | |
|---|---|---|---|---|---|
| JP | H11-133206 | A | | 5/1999 | |
| JP | 2006-051668 | A | | 2/2006 | |
| JP | 2006051668 | | * | 2/2006 | ............. B32B 27/34 |
| JP | 2009-133880 | A | | 6/2009 | |
| JP | 2009133880 | | * | 6/2009 | ............. C08F 220/10 |
| JP | 2010-044128 | A | | 2/2010 | |
| JP | 2012-078541 | A | | 4/2012 | |
| JP | 2012078541 | | * | 4/2012 | ................ C08J 7/06 |
| JP | 2013-091290 | A | | 5/2013 | |
| JP | 2013/218200 | | * | 10/2013 | ............... B32B 7/02 |
| JP | 2014-208767 | A | | 11/2014 | |
| JP | 2014208767 | | * | 11/2014 | ............. C08G 69/26 |
| JP | 2015-052790 | A | | 3/2015 | |
| JP | 2015-106033 | A | | 6/2015 | |
| JP | 2015106033 | | * | 6/2015 | ............... G02B 1/10 |
| JP | 2015-143754 | A | | 8/2015 | |
| JP | 5779039 | B2 | | 9/2015 | |
| JP | 2015-188772 | A | | 11/2015 | |
| JP | 2016-022684 | A | | 2/2016 | |
| JP | 2016-023232 | A | | 2/2016 | |
| JP | 2017-033033 | A | | 2/2017 | |
| WO | 2005/105918 | A1 | | 11/2005 | |

OTHER PUBLICATIONS

Horiuchi—JP 2006-051668 A—ISR D1—Kor.D2—ID—MT—aromatic polyamide w-high refract.index—2006 (Year: 2006).*
Hasegawa—JP 2009-133880 A—ISR D8+Kor D3—IDS—MT—hard coat w-fluorene skeleton+acrylate-metal oxide part. 1-200 nm—2009 (Year: 2009).*
Ota—JP 2012-078541 A—Kor.D1—MT—optical laminate w-low PV values—2012 (Year: 2012).*
Watanabe—JP 2014-208767 A—IDS—MT—polyamide w-high heat resistance & fluorene skeleton—2014 (Year: 2014).*
Katou—JP 2015-106033 A—ISR D7—IDS—MT-2 hard coats+substrate+another hard coat w-vickers hard+refract.Index—2015 (Year: 2015).*
Lucas—Live Science—Wavelength visible light—Feb. 1, 2022 (Year: 2015).*
Tashiro—JP 2013-218200 A—MT—colortone correction film—hard coat w-refract.index at 400 nm—2013 (Year: 2013).*

(Continued)

*Primary Examiner* — John Vincent Lawler

(74) *Attorney, Agent, or Firm* — Edwards Neils LLC; Jean C. Edwards, Esq.

(57) ABSTRACT

Provided are an optical film including a base material, and a hard coat layer, in which a refractive index of the base material at a wavelength of 550 nm is 1.60 or more, a difference between a refractive index of the base material at a wavelength of 435 nm and a refractive index of the base material at a wavelength of 610 nm is 0.11 or more, and a peak intensity PV value of a power spectrum obtained by subjecting a reflectivity spectrum of the optical film to fast Fourier transform is 0.3 or less, a polarizing plate having the optical film and an image display device.

11 Claims, No Drawings

(56) References Cited

OTHER PUBLICATIONS

Notification of Reasons for Refusal issued by the Japanese Patent Office dated Mar. 5, 2019, in connection with Japanese Patent Application No. 2016-062131.
Notification of Reasons for Refusal issued by the Korean Intellectual Property Office dated Feb. 14, 2020, in connection with Korean Patent Application No. 10-2018-7026377.
International Search Report issued in PCT/JP2017/011053 dated Jun. 13, 2017.
Written Opinion issued in PCT/JP2017/011053 dated Jun. 13, 2017.
International Preliminary Report on Patentability completed by WIPO dated Sep. 25, 2018, in connection with International Patent Application No. PCT/JP2017/011053.
Notification of Reasons for Refusal issued by the Korean Intellectual Property Office dated Aug. 2, 2019, in connection with Korean Patent Application No. 10-2018-7026377.

* cited by examiner

OPTICAL FILM, POLARIZING PLATE, AND IMAGE DISPLAY DEVICE

CROSS-REFERENCE TO RELATED APPLICATIONS

This is a continuation of International Application No. PCT/JP2017/011053 filed on Mar. 17, 2017, which was published under Article 21(2) in Japanese, and which claims priority under 35 U.S.C. § 119(a) from Japanese Patent Application No. 2016-062131 filed on Mar. 25, 2016. The above applications are hereby expressly incorporated by reference, in their entirety, into the present application.

BACKGROUND OF THE INVENTION

1. Field of the Invention

The present invention relates to an optical film, a polarizing plate, and an image display device.

2. Description of the Related Art

In image display devices such as a display device using a cathode ray tube (CRT), a plasma display panel (PDP), an electroluminescent display (ELD), a vacuum fluorescent display (VFD), a field emission display (FED), and a liquid crystal display (LCD), it is suitable to provide an optical film having a hard coat layer on a base material in order to prevent the display surface from being scratched.

In the optical film having a hard coat layer on the base material, there may be a case where tinted interference unevenness is generated due to the interference of reflected light by the interface between the base material and the hard coat layer and reflected light from the surface of the hard coat layer. The interference unevenness impairs visibility or image quality of a display image of the image display device, and therefore, improvements are required.

For example, JP2012-78541A discloses a technique of suppressing interference unevenness by providing a gradation layer in which a refractive index is gradually changed from a hard coat layer to a base material using a solvent having dissolving ability with respect to a base material containing cellulose acylate.

As the base material of the optical film, a film containing cellulose acylate, an acrylic resin, or polyethylene terephthalate, and the like is generally used. However, in recent years, with diversification of use environments and use forms of an image display device, it has been studied to use various materials for the base material. For example, JP2014-208767A discloses a specific polyamide resin and this resin is used to form an optical film.

In addition, JP2016-23232A discloses an optical film with bending resistance imparted by using a specific acrylic resin and a specific aliphatic polyamide.

Further, JP2013-91290A discloses a transparent gas barrier laminate formed by laminating an anchor coat layer and a vapor-deposited thin film layer on a plastic base material, and a refractive index adjuster formed of metal oxide particles is added to the anchor coat layer.

JP5779039B discloses a hard coating resin composition containing a monomer having a fluorene skeleton.

SUMMARY OF THE INVENTION

The present inventors have studied the development of an optical film having high hardness and excellent bending resistance and have focused particularly on an optical film having a base material containing aramid (aromatic polyamide). However, it has been found that the base material containing aramid has a high refractive index in a visible light range (380 to 780 nm) and a large difference between a refractive index at a short wavelength and a refractive index at a long wavelength (that is, a large refractive index wavelength dispersion), and in a case where a conventional hard coat layer is provided on the base material, a difference in refractive index between the base material and the hard coat layer becomes larger, so that interference unevenness is generated.

Further, as disclosed in JP2013-91290A, the technique in which a difference in refractive index between the anchor coat layer and the plastic base material is reduced by incorporating metal oxide particles into the anchor coat layer, and reflection at the interface is reduced to reduce color unevenness, and as disclosed in JP5779039B, the technique of obtaining a cured product having a high refractive index by using the hard coating resin composition containing a monomer having a fluorene skeleton are known. However, it has been found that the base material containing aramid has a very high refractive index at a short wavelength and thus interference unevenness cannot be suppressed simply by applying these techniques.

Accordingly, an object of the present invention is to provide an optical film having excellent bending resistance and capable of suppressing interference unevenness, a polarizing plate having the optical film, and an image display device.

As a result of intensive studies to achieve the object, the present inventors have found that the above object can be achieved by the following means.

<1> An optical film comprising:
a base material; and
a hard coat layer,
in which a refractive index of the base material at a wavelength of 550 nm is 1.60 or more,
a difference between a refractive index of the base material at a wavelength of 435 nm and a refractive index of the base material at a wavelength of 610 nm is 0.11 or more, and
a peak intensity PV value of a power spectrum obtained by subjecting a reflectivity spectrum of the optical film to fast Fourier transform is 0.3 or less.

<2> The optical film according to <1>, further comprising:
an interlayer between the base material and the hard coat layer,
in which the hard coat layer contains inorganic particles,
a difference between the refractive index of the base material at a wavelength of 435 nm and a refractive index of the interlayer at a wavelength of 435 nm is 0.05 or less,
a difference between the refractive index of the interlayer at a wavelength of 435 nm and a refractive index of the hard coat layer at a wavelength of 435 nm is 0.05 or less,
a difference between the refractive index of the base material at a wavelength of 610 nm and a refractive index of the interlayer at a wavelength of 610 nm is 0.05 or less, and
a difference between the refractive index of the interlayer at a wavelength of 610 nm and a refractive index of the hard coat layer at a wavelength of 610 nm is 0.05 or less.

<3> The optical film according to <1>, further comprising:
an interlayer between the base material and the hard coat layer,
in which the hard coat layer contains a polymer of a monomer having at least one skeleton selected from a fluorene skeleton, a dinaphthothiophene skeleton, a naphthalene skeleton, an anthracene skeleton, a benzotriazole skeleton, a triazine skeleton, a benzophenone skeleton, a merocyanine skeleton, a benzoxazole skeleton, a benzothiol skeleton, a triphenylene skeleton, a cinnamoyl skeleton, a bisphenol S skeleton, and a tolane skeleton, a difference between the refractive index of the base material at a wavelength of 435 nm and a refractive index of the interlayer at a wavelength of 435 nm is 0.05 or less, a difference between the refractive index of the interlayer at a wavelength of 435 nm and a refractive index of the hard coat layer at a wavelength of 435 nm is 0.05 or less, a difference between the refractive index of the base material at a wavelength of 610 nm and a refractive index of the interlayer at a wavelength of 610 nm is 0.05 or less, and a difference between the refractive index of the interlayer at a wavelength of 610 nm and a refractive index of the hard coat layer at a wavelength of 610 nm is 0.05 or less.

<4> The optical film according to <1>, in which the base material and the hard coat layer are in contact with each other, the hard coat layer contains inorganic particles and a polymer of a monomer having at least one skeleton selected from a fluorene skeleton, a dinaphthothiophene skeleton, a naphthalene skeleton, an anthracene skeleton, a benzotriazole skeleton, a triazine skeleton, a benzophenone skeleton, a merocyanine skeleton, a benzoxazole skeleton, a benzothiol skeleton, a triphenylene skeleton, a cinnamoyl skeleton, a bisphenol S skeleton, and a tolane skeleton, a difference between the refractive index of the base material at a wavelength of 435 nm and a refractive index of the hard coat layer at a wavelength of 435 nm is 0.05 or less, and a difference between the refractive index of the base material at a wavelength of 610 nm and a refractive index of the hard coat layer at a wavelength of 610 nm is 0.05 or less.

<5> The optical film according to any one of <1> to <4>, in which the base material contains aramid.

<6> The optical film according to any one of <1> to <5>, in which a refractive index of the hard coat layer at a wavelength of 550 nm is 1.56 or more.

<7> The optical film according to any one of <1> to <6>, in which the number of times of folding endurance of the optical film measured by an MIT test machine according to JIS P 8115 (2001) is 1000 or more.

<8> A polarizing plate comprising:

the optical film according to any one of <1> to <7>.

<9> An image display device comprising:

the optical film according to any one of <1> to <7>; or the polarizing plate according to <8>.

According to the present invention, it is possible to provide an optical film having excellent bending resistance and capable of suppressing interference unevenness, a polarizing plate having the optical film, and an image display device.

DESCRIPTION OF THE PREFERRED EMBODIMENTS

Hereinafter, embodiments for carrying out the present invention will be described in detail, but the present invention is not limited thereto. Meanwhile, in the present specification, in a case where numerical values represent physical property values, characteristic values and the like, the description "(numerical value 1) to (numerical value 2)" represents the meaning of "(numerical value 1) or more and (numerical value 2) or less". Further, in the present specification, the description "(meth)acrylic resin" represents the meaning of "at least one of acrylic resin and methacrylic resin. The same also applies to "(meth)acrylate", "(meth) acryloyl" and the like.

In the present invention, the expressions "a repeating unit corresponding to a monomer" and "a repeating unit derived from a monomer" mean that a component obtained after polymerization of a monomer is a repeating unit.

[Optical Film]

An optical film of the present invention includes a base material, and a hard coat layer, in which a refractive index of the base material at a wavelength of 550 nm is 1.60 or more, a difference between a refractive index of the base material at a wavelength of 435 nm and a refractive index of the base material at a wavelength of 610 nm (refractive index of base material at wavelength of 435 nm—refractive index of base material at wavelength of 610 nm) is 0.11 or more, and a peak intensity PV value of a power spectrum obtained by subjecting a reflectivity spectrum of the optical film to fast Fourier transform is 0.3 or less.

[PV Value]

In the optical film of the present invention, a peak intensity PV value (also simply referred to as "PV value") of a power spectrum obtained by subjecting a reflectivity spectrum of the optical film to Fourier transform is 0.3 or less.

The PV value is a value expressing a size of reflection at the interface and refers to a peak intensity of a power spectrum obtained by subjecting variations derived from thin film interference of the reflectivity spectrum as described previously to fast Fourier transform. As a difference in refractive index at the interface becomes smaller, the intensity becomes smaller, and as a difference in refractive index at the interface becomes larger, the intensity becomes larger.

In a case where the optical film has an interlayer, a larger value of the peak intensities corresponding two interfaces between the base material and the interlayer, and between the interlayer and the hard coat layer in the power spectrum is defined as the PV value and employed as an index for the interference unevenness. It is meant that the smaller this value is, the more suppressed the interference unevenness is.

The PV value of the optical film of the present invention is 0.3 or less, preferably 0.25 or less, more preferably 0.2 or less, even more preferably 0.15 or less, particularly preferably 0.1 or less, and most preferably 0.05 or less. The smaller the PV value is, the more preferable it is.

In order to achieve the above range of the PV value, the optical film of the present invention is preferably an optical film according to the following aspect (A), (B), or (C).

(A): An aspect in which an interlayer is further provided between the base material and the hard coat layer, the hard coat layer contains inorganic particles, a difference between the refractive index of the base material at a wavelength of 435 nm and a refractive index of the interlayer at a wavelength of 435 nm is 0.05 or less, a difference between the refractive index of the interlayer at a wavelength of 435 nm and a refractive index of the hard coat layer at a wavelength of 435 nm is 0.05 or less, a difference between the refractive index of the base material at a wavelength of 610 nm and a refractive index of the interlayer at a wavelength of 610 nm is 0.05 or less, and a difference between the refractive index of the interlayer at a wavelength of 610 nm and a refractive index of the hard coat layer at a wavelength of 610 nm is 0.05 or less.

(B): An aspect in which an interlayer is further provided between the base material and the hard coat layer, the hard coat layer contains a polymer of a monomer having at least one skeleton selected from a fluorene skeleton, a dinaphthothiophene skeleton, a naphthalene skeleton, an anthracene skeleton, a benzotriazole skeleton, a triazine skeleton, a benzophenone skeleton, a merocyanine skeleton, a benzoxazole skeleton, a benzothiol skeleton, a triphenylene skeleton, a cinnamoyl skeleton, a bisphenol S skeleton, and a tolane skeleton, a difference between the refractive index of the base material at a wavelength of 435 nm and a refractive index of the interlayer at a wavelength of 435 nm is 0.05 or less, a difference between the refractive index of the interlayer at a wavelength of 435 nm and a refractive index of the hard coat layer at a wavelength of 435 nm is 0.05 or less, a difference between the refractive index of the base material at a wavelength of 610 nm and a refractive index of the interlayer at a wavelength of 610 nm is 0.05 or less, and a difference between the refractive index of the interlayer at a wavelength of 610 nm and a refractive index of the hard coat layer at a wavelength of 610 nm is 0.05 or less.

(C): An aspect in which the base material and the hard coat layer are in contact with each other, the hard coat layer contains inorganic particles and a polymer of a monomer having at least one skeleton selected from a fluorene skeleton, a dinaphthothiophene skeleton, a naphthalene skeleton, an anthracene skeleton, a benzotriazole skeleton, a triazine skeleton, a benzophenone skeleton, a merocyanine skeleton, a benzoxazole skeleton, a benzothiol skeleton, a triphenylene skeleton, a cinnamoyl skeleton, a bisphenol S skeleton, and a tolane skeleton, a difference between the refractive index of the base material at a wavelength of 435 nm and a refractive index of the hard coat layer at a wavelength of 435 nm is 0.05 or less, and a difference between the refractive index of the base material at a wavelength of 610 nm and a refractive index of the hard coat layer at a wavelength of 610 nm is 0.05 or less.

Since each of the aspects (A) and (B) has an interlayer having a small difference in refractive index between the base material and the hard coat layer at a wavelength of 435 nm and at a wavelength of 610 nm provided between the base material and the hard coat layer and the refractive index gradually changes in order of the hard coat layer, the interlayer, and the base material, it is possible to suppress the generation of interference unevenness.

In the aspects (A) and (B), it is preferable that a difference between the refractive index of the base material at a wavelength of 435 nm and the refractive index of the interlayer at a wavelength of 435 nm is 0.03 or less, it is preferable that a difference between the refractive index of the interlayer at a wavelength of 435 nm and the refractive index of the hard coat layer at a wavelength of 435 nm is 0.03 or less, it is preferable that a difference between the refractive index of the base material at a wavelength of 610 nm and the refractive index of the interlayer at a wavelength of 610 nm is 0.03 or less, and it is preferable that a difference between the refractive index of the interlayer at a wavelength of 610 nm and the refractive index of the hard coat layer at a wavelength of 610 nm is 0.03 or less.

In the aspect (C), since a difference in refractive index between the base material and the hard coat layer at a wavelength of 435 nm and at a wavelength of 610 nm is small, it is possible to suppress the generation of interference unevenness.

In the aspect (C), it is preferable that a difference between the refractive index of the base material at a wavelength of 435 nm and the refractive index of the hard coat layer at a wavelength of 435 nm is 0.03 or less, and it is preferable that a difference between the refractive index of the base material at a wavelength of 610 nm and the refractive index of the hard coat layer at a wavelength of 610 nm is 0.03 or less.

[Base Material]

The base material of the optical film of the present invention has a refractive index of 1.60 or more at a wavelength of 550 nm and a difference between the refractive index at a wavelength of 435 nm and the refractive index at a wavelength of 610 nm is 0.11 or more.

The transmittance of the base material in a visible light range is preferably 70% or higher and more preferably 80% or higher.

The base material is preferably a base material containing aramid.

The thickness of the base material is not particularly limited but is preferably 3 μm to 100 μm, more preferably 5 μm to 80 μm, and even more preferably 15 μm to 50 μm.

[Hard Coat Layer]

The refractive index of the hard coat layer in the above aspects (A) and (B) will be described below.

The refractive index of the hard coat layer at a wavelength of 550 nm is preferably 1.56 or more, more preferably 1.63 or more and 1.79 or less, and even more preferably 1.66 or more and 1.76 or less. In a case where refractive index of the hard coat layer at a wavelength of 550 nm is 1.56 or more, a difference between the refractive index of the hard coat layer and the refractive index of the base material is small and thus the generation of interference unevenness is easily suppressed.

The refractive index of the hard coat layer at a wavelength of 435 nm is preferably 1.73 or more and 1.89 or less and more preferably 1.76 or more and 1.86 or less.

The refractive index of the hard coat layer at a wavelength of 610 nm is preferably 1.60 or more and 1.76 or less and more preferably 1.63 or more and 1.73 or less.

The refractive index of the hard coat layer in the aspect (C) will be described below.

The refractive index of the hard coat layer at a wavelength of 550 nm is preferably 1.56 or more, more preferably 1.68 or more 1.84 or less, and even more preferably 1.71 or more and 1.81 or less. In a case where the refractive index of the hard coat layer at a wavelength of 550 nm is 1.56 or more, a difference between the refractive index of the hard coat layer and the refractive index of the base material is small and thus the generation of interference unevenness is easily suppressed.

The refractive index of the hard coat layer at a wavelength of 435 nm is preferably 1.78 or more and 1.93 or less and more preferably 1.81 or more and 1.91 or less.

The refractive index of the hard coat layer at a wavelength of 610 nm is preferably 1.65 or more and 1.81 or less and more preferably 1.68 or more and 1.78 or less.

[Inorganic Particle]

In the aspects (A) and (C), the hard coat layer contains inorganic particles. In the aspect (B), the hard coat layer may also further contain inorganic particles.

As the inorganic particles, particles of oxides of metals (for example, Ti, Zr, In, Zn, Sn, Sb, and Al) are preferable, and from the viewpoint of the refractive index, zirconium oxide particles or titanium oxide particles are more preferable. From the viewpoint that in a case where the average primary particle diameter of titanium oxide particles is set to less than 10 nm, optical activity becomes stronger and the surrounding organic substances are easily decomposed, zirconium oxide particles (zirconia particles) are most preferable.

The refractive index can be adjusted by changing the content of the inorganic particles in the hard coat layer.

The content of the inorganic particles in the hard coat layer is preferably 5% to 80% by volume, more preferably 10% to 60% by volume, and even more preferably 20% to 50% by volume with respect to the entire hard coat layer. In a case where the content of the inorganic particles is 5% by volume or more, the refractive index of the hard coat layer can be increased and in a case where the content of the inorganic particles is 80% by volume or less, the film is easily formed.

A suitable content of the inorganic particles in the hard coat layer in terms of % by mass changes according to the specific gravity of inorganic particles and for example, in a case of using zirconium oxide particles having a specific gravity of 6 as inorganic particles, the suitable content is preferably 21% to 95% by mass, more preferably 36% to 88% by mass, and even more preferably 56% to 83% by mass with respect to the entire hard coat layer.

The average primary particle diameter of the inorganic particles is preferably 1 to 80 nm, more preferably 1 to 40 nm, and is even more preferably 2 to 20 nm.

In addition, it is preferable that the inorganic particles are contained in the hard coat layer using a resin described later as a binder component, and are modified with a compound having a polymerizable group to impart the polymerizable group onto the surface of the inorganic particles so as to improve adhesiveness with the binder component in the hard coat layer.

[Resin]

In the aspects (A) to (C), it is preferable that the hard coat layer contains a resin and it is preferable that the resin is a polymer of a monomer (polymerizable compound).

The monomer may be used singly or in combination of two or more thereof.

The monomer preferably contains an unsaturated polymerizable functional group such as a (meth)acryloyl group, a vinyl group, a styryl group, or an allyl group, and among these, the monomer preferably contains a (meth)acryloyl group.

[Monomer (a)]

In the aspects (B) and (C), it is preferable that the hard coat layer contains a compound (also referred to as "monomer (a)") having at least one skeleton selected from a fluorene skeleton, a dinaphthothiophene skeleton, a naphthalene skeleton, an anthracene skeleton, a benzotriazole skeleton, a triazine skeleton, a benzophenone skeleton, a merocyanine skeleton, a benzoxazole skeleton, a benzothiol skeleton, a triphenylene skeleton, a cinnamoyl skeleton, a bisphenol S skeleton, and a tolane skeleton, as the monomer.

By using the monomer (a), the refractive index of the hard coat layer can be increased. Specific examples of the monomer (a) include compounds represented by Formulae (I) to (VI) described in paragraphs 0029 to 0046 of JP2007-91876A, fluorene compounds described in paragraphs 0113 to 0115 of JP2014-34596A, fused ring-containing compounds represented by Formula (I) of JP2014-80572A (preferably, fused ring-containing compounds represented by Formula (III) of JP2014-80572A), compounds described in paragraph 0016 of JP2013-253161A, compounds described in paragraphs 0025 to 0153 of JP2006-301614A, compounds described in paragraphs 0020 to 0122 of JP2007-108732A, and compounds described in paragraphs 0012 to 0108 of JP2010-244038A.

As the monomer (a), particularly, a compound having at least one skeleton selected from a fluorene skeleton, a dinaphthothiophene skeleton, a naphthalene skeleton, and an anthracene skeleton is preferable and a compound having a fluorene skeleton is most preferable.

Also, in the aspect (A), the hard coat layer may further a polymer of a monomer including the monomer (a).

[Monomer (b)]

In the aspects (A) and (B), it is also preferable that, as the monomer for forming the resin of the hard coat layer, a monomer (also referred to as "monomer (b)") other than the monomer (a) is used. Specific examples of such a monomer include (meth)acrylic acid diesters of alkylene glycol such as neopentyl glycol acrylate, 1,6-hexanediol (meth)acrylate, propylene glycol di(meth)acrylate;

(meth)acrylic acid diesters of polyoxyalkylene glycol such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohol such as pentaerythritol di(meth)acrylate, and (meth)acrylic acid diesters of ethylene oxide or propylene oxide adduct such as 2,2-bis {4-(acryloxy.diethoxy) phenyl}propane, and 2-2-bis {4-(acryloxy.polypropoxy) phenyl}propane.

Further, epoxy (meth)acrylates, urethane (meth)acrylates, and polyester (meth)acrylates can also be used.

Among these, esters of a polyhydric alcohol and (meth) acrylic acid are preferable. Further, a polyfunctional monomer having three or more (meth)acryloyl groups in one molecule is preferable. That is, it is preferable that the hard coat layer contains a cured product of a polyfunctional monomer having three or more (meth)acryloyl groups in one molecule.

Examples thereof include pentaerythritol tetra(meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri(meth)acrylate, EO-modified phosphoric acid tri(meth)acrylate, trimethylolethane tri(meth) acrylate, ditrimethylolpropane tetra(meth)acrylate, dipentaerythritol tetra(meth)acrylate, dipentaerythritol penta (meth)acrylate, dipentaerythritol hexa(meth)acrylate, pentaerythritol hexa(meth)acrylate, 1,2,3-cyclohexane tetramethacrylate, polyurethane acrylate, polyester polyacrylate, and caprolactone-modified tris(acryloxyethyl)isocyanurate.

In the aspect (C), as the monomer for forming the resin of the hard coat layer, the monomer (b) may also be used in combination.

The film thickness of the hard coat layer of the optical film of the present invention is not particularly limited and is preferably 1 μm to 10 μm, more preferably 1.5 μm to 8 μm, and even more preferably 2 μm to 5 μm.

[Interlayer]

The interlayer in the aspects (A) and (B) will be described.

The interlayer is not particularly limited as long as the refractive index at a wavelength of 435 nm and the refractive index at a wavelength of 610 nm satisfy the above-described relationships. However, a layer containing both the component in the base material (preferably aramid) and the component in the hard coat layer (in the aspect (A), preferably, the polymer of the monomer, and in the aspect (B), preferably, the polymer of the monomer including the monomer (a)) is preferable.

It is preferable that the interlayer is in contact with the base material and the hard coat layer.

The film thickness of the interlayer is not particularly limited but is preferably 1 μm to 10 μm, more preferably 3 μm to 8 μm, and even more preferably 5 μm to 7 μm.

The film thickness of the hard coat layer and the interlayer is obtained as follows.

The thickness of the base material before the hard coat layer is formed and the thickness of an optical film sample to be prepared are measured using a contact type thickness meter. In addition, the optical film sample is cut with a microtome, the cross section thereof is exposed, and the exposed cross section is observed with an optical microscope to calculate the film thickness of the hard coat layer.

The film thickness of the interlayer is calculated by the following equation.

(Film thickness of interlayer)=(Thickness of optical film sample)−(Thickness of base material before hard coat layer is formed)−(Film thickness of hard coat layer)

The refractive indices of the base material, the hard coat layer, and the interlayer are obtained as follows.

A measurement sample is prepared by laminating a polyethylene terephthalate film painted black on the surface of the optical film on which the hard coat layer is not provided. The measurement sample is set in a reflective spectrographic film thickness meter (trade name: FE-3000, manufactured by Otsuka Electronics Co., Ltd.) and a reflection spectrum is obtained using a D2 lamp light source. Substrate analysis is performed using bundled software and operation is performed in a wavelength range of 350 to 800 nm with n-Cauchy to calculate each refractive index. The refractive index of the hard coat layer is obtained by measuring the surface of the optical film, and the refractive index of the interlayer is obtained by obliquely cutting the cross section of the optical film in the film thickness direction with a microtome and measuring the interlayer portion. The refractive index of the base material may be obtained by measuring the base material before the hard coat layer is formed or the base material portion by oblique cutting.

The number of times of folding endurance of the optical film of the present invention measured by an MIT test machine according to Japanese Industrial Standards (JIS) P 8115 (2001) is preferably 1000 or more.

[Method of Producing Optical Film]

The optical film of the aspect (A) is preferably produced by a method of producing an optical film including a step of applying a hard coat layer forming composition containing inorganic particles, a monomer, and a solvent for swelling the base material onto the base material and a step of polymerizing the monomer.

The optical film of the aspect (B) is preferably produced by a method of producing an optical film including a step of applying a hard coat layer forming composition containing a monomer including the monomer (a) and a solvent for swelling the base material onto the base material and a step of polymerizing the monomer.

The optical film of the aspect (C) is preferably produced by a method of producing an optical film including a step of applying a hard coat layer forming composition containing inorganic particles, a monomer including the monomer (a), and a solvent onto the base material and a step of polymerizing the monomer.

In a case where the optical films of the aspects (A) and (B) are produced, the solvent of the hard coat layer forming composition preferably includes a solvent for swelling the base material. In a case where the hard coat layer forming composition containing the solvent for swelling the base material is applied onto the base material, the base material is swollen, a part of the monomer in the hard coat layer forming composition permeates into the base material, and then the monomer is polymerized. Thus, the interlayer containing both the component in the base material and the component in the hard coat layer is formed.

As the solvent for swelling the base material, a solvent having a boiling point of 180° C. or lower is preferable and examples thereof include methyl acetate, ethyl acetate, methyl isobutyl ketone, methyl ethyl ketone, acetone, ethanol, methanol, 1-methoxy-2-propanol, and cyclohexanone.

The solvent for swelling the base material is a solvent of which, in a case where after a 5 cm square base material is immersed in the solvent at 25° C. for 5 minutes and then dried at 120° C. for 5 minutes, the base material is placed on a flat surface, the projection does not fall within a 4.5 cm square frame, and/or a solvent which makes the mass of the base material 99.00/or less of the original mass.

In a case where the optical film of the aspect (C) is produced, as the solvent, solvents other than the solvent for swelling the base material can be used. Examples of the solvents include toluene, propyl acetate, 1-hexanol, and propylene glycol monomethyl ether acetate.

In addition, in a case where the optical films of the aspects (A) and (B) are produced, in addition to the solvent for swelling the base material, the above solvents may be used.

[Polymerization Initiator] The hard coat layer forming composition may include a polymerization initiator.

In a case where the monomer is a photopolymerizable compound, it is preferable that the hard coat layer forming composition includes a photopolymerization initiator.

Examples of the photopolymerization initiator include acetophenones, benzoins, benzophenones, phosphine oxides, ketals, anthraquinones, thioxanthones, azo compounds, peroxides, 2,3-dialkyl-dione compounds, disulfide compounds, fluoroamine compounds, aromatic sulfoniums, lophine dimers, onium salts, borate salts, active esters, active halogens, inorganic complexes, and coumarins. Specific examples preferable embodiments, and commercially available products of the photopolymerization initiator are disclosed in paragraphs [0133] to [0151] of JP2009-098658A. and can be suitably used in the present invention in the same manner.

Various examples are disclosed also in page 159, "Recent UV Curing Technology" {Gijutsu Joho Kyokai KK} (1991) and pages 65 to 148 "Ultraviolet light Curing System" written by Kiyomi KATO (General Technology Center Publication: 1989), and thus are useful in the present embodiment.

The content of the polymerization initiator in the hard coat layer forming composition is preferably 0.50% to 8% by mass and more preferably 1% to 5% by mass with respect to the total solid content in the hard coat layer forming composition.

The hard coat layer forming composition may contain components other than the above components and for example, a leveling agent or a dispersing agent may be used.

The method of applying the hard coat layer forming composition is not particularly limited, and known methods can be used. Examples thereof include a dip coating method, an air knife coating method, a curtain coating method, a roller coating method, a wire bar coating method, a gravure coating method, and a die coating method.

A step of applying hard coat layer forming composition onto the base material and then heating the composition maybe provided. In a case of using the solvent for swelling the base material, a part of the monomer can be caused to effectively permeate into the base material by heating. The temperature at heating is preferably lower than the glass transition temperature of the base material and specifically, the temperature is preferably 60° C. to 180° C. and more preferably 80° C. to 130° C.

In a case where the monomer is a photopolymerizable monomer, the polymerization of the monomer can be performed by irradiation with ionizing radiation. The kind of the ionizing radiation is not particularly limited and examples thereof include X-rays, electronic beams, ultraviolet rays, visible light, and infrared rays. Ultraviolet rays are widely used. The irradiation dose is not particularly limited but is preferably 10 mJ/cm$^2$ to 1000 mJ/cm$^2$. In a case of irradiation, the above energy may be emitted at one time or may be emitted in a divided manner. As the kind of the ultraviolet lamp, a metal halide lamp, a high pressure mercury lamp, or the like is suitably used.

The optical film of the present invention can be suitably used as a polarizing plate protective film.

The polarizing plate protective film using the optical film of the present invention can be used as a polarizing plate by laminating a polarizer, and can be suitably used in a liquid crystal display device.

[Polarizing Plate]

The polarizing plate is a polarizing plate having a polarizer and at least one protective film for protecting the polarizer, and at least one of the protective films is preferably the optical film of the present invention.

For the polarizer, an iodine-based polarizing film, a dye-based polarizing film using a dichroic dye, or a polyene-based polarizing film is used. The iodine-based polarizing film and the dye-based polarizing film can be in general manufactured by using a polyvinyl alcohol-based film.

[Image Display Device]

The optical film or the polarizing plate of the present invention can be applied to an image display device.

Examples of the image display device include a display device using a cathode ray tube (CRT), a plasma display panel (PDP), an electroluminescent display (ELD), a vacuum fluorescent display (VFD), a field emission display (FED), and a liquid crystal display (LCD), and a liquid crystal display device is particularly preferable.

In general, the liquid crystal display device includes a liquid crystal cell and two polarizing plates arranged on both sides thereof, and the liquid crystal cell carries a liquid crystal between two electrode substrates. Furthermore, one optically anisotropic layer is arranged between the liquid crystal cell and the polarizing plate of one side, or two optically anisotropic layers may be arranged between the liquid crystal cell and each of the both polarizing plates. For the liquid crystal cell, liquid crystal cells of various driving modes such as a twisted nematic (TN) mode, a vertically aligned (VA) mode, an optically compensatory bend (OCB) mode, and an in-plane switching (IPS) mode can be applied.

EXAMPLES

The present invention is more specifically described below with reference to the following Examples, but it should not be construed that the scope of the present invention is limited thereto. Incidentally, all "parts" and "%" are on a mass basis unless otherwise specified.

[Preparation of Optical Film]

As shown below, hard coat layer forming compositions (coating solutions) were prepared and a hard coat layer was formed by using each hard coat layer forming composition to prepare an optical film sample.

(Preparation of Hard Coat Layer Forming Composition)

Each component was put into a mixing tank such that the components have the compositions (parts by mass) shown in Table 1 and stirred, and the mixture was filtered through a polypropylene filter having a pore diameter of 0.4 μm to prepare coating solutions A to H.

TABLE 1

| | Hard coat layer forming composition | | | | | | | |
|---|---|---|---|---|---|---|---|---|
| Component | Coating Solution A | Coating Solution B | Coating Solution C | Coating Solution D | Coating Solution E | Coating Solution F | Coating Solution G | Coating Solution H |
| DPHA | 31.35 | 52.25 | 3.18 | 0.00 | 4.93 | 0.00 | 0.00 | 31.35 |
| PET30 | 20.90 | 0.00 | 0.00 | 0.00 | 4.93 | 19.00 | 0.00 | 20.90 |
| OGSOL EA-0200 | 0.00 | 0.00 | 0.00 | 28.50 | 0.00 | 28.50 | 11.83 | 0.00 |
| Zirconia particles (30 wt % toluene dispersion) | 0.00 | 0.00 | 84.42 | 0.00 | 46.30 | 0.00 | 55.56 | 0.00 |
| Methyl acetate | 22.50 | 0.00 | 0.00 | 0.00 | 0.00 | 0.00 | 0.00 | 0.00 |
| Methyl ethyl ketone | 22.50 | 0.00 | 0.00 | 0.00 | 0.00 | 0.00 | 0.00 | 0.00 |
| Acetone | 0.00 | 0.00 | 0.00 | 0.00 | 22.50 | 15.00 | 0.00 | 13.50 |
| Toluene | 0.00 | 45.00 | 10.91 | 70.00 | 20.09 | 35.00 | 31.11 | 31.50 |
| IRGACURE 184 | 2.75 | 2.75 | 1.50 | 1.50 | 1.25 | 2.50 | 1.50 | 2.75 |

The unit of the content of each component is part(s) by mass.
DPHA: Mixture of dipentaerythritol pentaacrylate and dipentaerythritol hexaacrylate (manufactured by Nippon Kayaku Co., Ltd.)
PET30: Mixture of pentaerythritol tetraacrylate and pentaerythritol triacrylate (manufactured by Nippon Kayaku Co., Ltd.)
OGSOL EA-0200: Acrylate monomer having a fluorene skeleton (manufactured by Osaka Gas Chemicals Co., Ltd.)
Zirconia particles (30% toluene solution): Average primary particle diameter: 20 nm (manufactured by CIK Nanotec Co.)
IRGACURE 184: Photopolymerization initiator (manufactured by BASF)

(Preparation of Optical Film A)

The coating solution A was applied onto a triacetyl cellulose film (FUJITACK TD40UL, manufactured by Fujifilm Corporation) as a base material having a thickness of 40 μm using a gravure coater. After drying at 100° C., the coating layer was cured by irradiation with ultraviolet rays at an irradiation dose of 300 mJ/cm$^2$ by using an air-cooled metal halide lamp (manufactured by Eye Graphics Co., Ltd.) of 160 W/cm while purging with nitrogen so as to have an atmosphere of an oxygen concentration of 100 ppm or less, thereby forming a hard coat layer. There was thus prepared an optical film A. The coating amount was adjusted such that thickness of the hard coat layer was 3 μm.

(Preparation of Optical Films B to H)

Each of the coating solutions B to H was applied onto a base material S-4 using a gravure coater. After drying at 120° C., the coating layer was cured by irradiation with ultraviolet rays at an irradiation dose of 300 mJ/cm$^2$ by using an air-cooled metal halide lamp (manufactured by Eye Graphics Co., Ltd.) of 160 W/cm while purging with nitrogen so as to have an atmosphere of an oxygen concentration of 100 ppm or less, thereby forming each hard coat layer. There were thus prepared optical films B to H. The coating amount was adjusted such that thickness of the hard coat layer was 3 μm.

(Preparation of Base Material S-4)

[Synthesis of Aromatic Polyamide]

Into a polymerization tank equipped with a stirrer, 674.7 kg of N-methyl-2-pyrrolidone, 10.6 g of anhydrous lithium bromide (manufactured by Sigma-Aldrich Japan KK), 33.3 g of 2,2'-ditrifluoromethyl-4,4'-diaminobiphenyl ("TFMB" manufactured by Toray Fine Chemical Co., Ltd.), and 2.9 g of 4,4'-diaminodiphenylsulfone ("44DDS" manufactured by Wakayama Seika Kogyo Co., Ltd.) were put and cooled to 15° C. under nitrogen atmosphere, and 18.5 g of terephthalic acid dichloride (manufactured by Tokyo Chemical Industry Co., Ltd.) and 6.4 g of 4,4'-biphenyldicarbonylchloride ("4BPAC" manufactured by Toray Fine Chemical Co., Ltd.) were added in portions 4 times over 300 minutes while being stirred. The mixture was stirred for 60 minutes, and then hydrogen chloride generated from the reaction was neutralized with lithium carbonate to obtain a polymer solution.

A portion of the polymer solution obtained above was cast on an endless belt at 120° C. using a T die, such that the thickness of the final film was 40 μm, and the film was dried so as to have a polymer concentration of 40 mass %, and peeled from the endless belt.

Subsequently, the film including the solvent was stretched by 1.1 times in the machine direction (MD) in the atmosphere at 40° C., and washed with water at 50° C. to remove the solvent. Further, the film was stretched by 1.2 times in the transverse direction (TD) in a drying furnace at 340° C. to obtain a base material S-4 formed of aromatic polyamide and having a thickness of 40 μm.

(Interference Unevenness Evaluation)

A polyethylene terephthalate film painted black was laminated on the surface of the optical film on which the hard coat layer was not provided to prepare a measurement sample. The measurement sample was set on a reflective spectrographic film thickness meter (trade name: FE-3000, manufactured by Otsuka Electronics Co., Ltd.) and a reflection spectrum was obtained using a D2 lamp light source. The obtained spectrum was subjected to fast Fourier transform analysis and thus the peak intensity PV value derived from interference unevenness was obtained. In addition, in a case where there were a plurality of PV values, the largest value was adopted as the PV value.

Material category: Standard

Algorithm: Fast Fourier Transform (FFT)

FFT analysis operation wavelength range: 400.00 to 750.00 nm (Bending Resistance Evaluation)

A sample film having a width of 15 mm and a length of 150 mm which had been left to stand in a state of a temperature of 25° C. and a relative humidity of 65% for 1 hour or longer was used to measure the folding endurance according to JIS P 8115 (2001) under a condition of a load of 500 g using a folding endurance test machine (MIT. BE-201 type, bending curvature radius: 0.38 mm, manufactured by Tester Sangyo Co. Ltd.). The folding endurance was evaluated based on the number of times of folding until the film was broken. As the number of times of folding increases, the bending resistance becomes further excellent and the resistance to repeated bending becomes further excellent.

A case where the number of times of folding before the film was broken was less than 1000 was determined as "poor" and a case where the number of times of folding before the film was broken was 1000 or more was determined as "excellent".

TABLE 2

| | | Comparative Example 1 | Comparative Example 2 | Comparative Example 3 | Comparative Example 4 | Comparative Example 5 | Example 1 | Example 2 | Example 3 |
|---|---|---|---|---|---|---|---|---|---|
| Optical film | | A | B | C | D | H | E | F | G |
| Base material refractive index | 435 nm | 1.48 | 1.86 | 1.86 | 1.86 | 1.86 | 1.86 | 1.86 | 1.86 |
| | 550 nm | 1.48 | 1.75 | 1.75 | 1.75 | 1.75 | 1.75 | 1.75 | 1.75 |
| | 610 nm | 1.49 | 1.73 | 1.73 | 1.73 | 1.73 | 1.73 | 1.73 | 1.73 |
| Hard coat layer forming coating solution | | Coating solution A | Coating solution B | Coating solution C | Coating solution D | Coating solution H | Coating solution E | Coating solution F | Coating solution G |
| Interlayer refractive index | 435 nm | — | — | — | — | 1.81 | 1.81 | 1.81 | — |
| | 610 nm | — | — | — | — | 1.73 | 1.73 | 1.73 | — |
| Interlayer thickness (μm) | | — | — | — | — | 5 | 5 | 5 | — |
| Hard coat layer refractive index | 435 nm | 1.57 | 1.57 | 1.75 | 1.78 | 1.57 | 1.76 | 1.77 | 1.82 |
| | 550 nm | 1.54 | 1.54 | 1.74 | 1.74 | 1.54 | 1.75 | 1.73 | 1.78 |
| | 610 nm | 1.54 | 1.54 | 1.73 | 1.72 | 1.54 | 1.74 | 1.71 | 1.77 |
| Hard coat layer thickness (μm) | | 3 | 3 | 3 | 3 | 3 | 3 | 3 | 3 |
| Bending resistance | | Poor | Excellent | Excellent | Excellent | Excellent | Excellent | Excellent | Excellent |
| Interference unevenness (PV value) | | 0.12 | 0.59 | 0.38 | 0.32 | 0.32 | 0.26 | 0.22 | 0.14 |

According to the present invention, it is possible to provide an optical film having excellent bending resistance and capable of suppressing interference unevenness, a polarizing plate having the optical film, and an image display device.

The present invention has been described with reference to the detailed or specific embodiments, but it is apparent to those skilled in the art that various changes and modifications can be made without departing from the spirit and scope of the present invention.

This application is based on Japanese patent application filed on Mar. 25, 2016 (Japanese Patent Application No. 2016-062131), the content of which is incorporated herein by reference.

What is claimed is:

1. An optical film comprising:
a base material; and
a hard coat layer,
wherein a refractive index of the base material at a wavelength of 550 nm is 1.60 or more,
wherein a refractive index of the hard coat layer at a wavelength of 435 nm is 1.73 or more and 1.89 or less,
a difference between a refractive index of the base material at a wavelength of 435 nm and a refractive index of the base material at a wavelength of 610 nm is 0.11 or more, and
a peak intensity PV value of a power spectrum obtained by subjecting a reflectivity spectrum of the optical film to fast Fourier transform is 0.3 or less;
further comprising:
an interlayer between the base material and the hard coat layer,
wherein the hard coat layer contains inorganic particles,
a difference between the refractive index of the base material at a wavelength of 435 nm and a refractive index of the interlayer at a wavelength of 435 nm is 0.05 or less,
a difference between the refractive index of the interlayer at a wavelength of 435 nm and a refractive index of the hard coat layer at a wavelength of 435 nm is 0.05 or less,
a difference between the refractive index of the base material at a wavelength of 610 nm and a refractive index of the interlayer at a wavelength of 610 nm is 0.05 or less, and
a difference between the refractive index of the interlayer at a wavelength of 610 nm and a refractive index of the hard coat layer at a wavelength of 610 nm is 0.05 or less.

2. The optical film according to claim 1,
wherein the base material contains aramid.

3. The optical film according to claim 1,
wherein number of times of folding endurance of the optical film measured by an MIT test machine according to JIS P8115 (2001) is 1000 or more.

4. A polarizing plate comprising:
the optical film according to claim 1.

5. An image display device comprising:
the optical film according to claim 1.

6. An optical film comprising:
a base material; and
a hard coat layer,
wherein a refractive index of the base material at a wavelength of 550 nm is 1.60 or more,
wherein a refractive index of the hard coat layer at a wavelength of 435 nm is 1.73 or more and 1.89 or less,
a difference between a refractive index of the base material at a wavelength of 435 nm and a refractive index of the base material at a wavelength of 610 nm is 0.11 or more, and
a peak intensity PV value of a power spectrum obtained by subjecting a reflectivity spectrum of the optical film to fast Fourier transform is 0.3 or less;
further comprising:
an interlayer between the base material and the hard coat layer,
wherein the hard coat layer contains a polymer of a monomer having at least one skeleton selected from a fluorene skeleton, a dinaphthothiophene skeleton, a naphthalene skeleton, an anthracene skeleton, a benzotriazole skeleton, a triazine skeleton, a benzophenone skeleton, a merocyanine skeleton, a benzoxazole skeleton, a benzothiol skeleton, a triphenylene skeleton, a cinnamoyl skeleton, a bisphenol S skeleton, and a tolane skeleton,
a difference between the refractive index of the base material at a wavelength of 435 nm and a refractive index of the interlayer at a wavelength of 435 nm is 0.05 or less,
a difference between the refractive index of the interlayer at a wavelength of 435 nm and a refractive index of the hard coat layer at a wavelength of 435 nm is 0.05 or less,
a difference between the refractive index of the base material at a wavelength of 610 nm and a refractive index of the interlayer at a wavelength of 610 nm is 0.05 or less, and
a difference between the refractive index of the interlayer at a wavelength of 610 nm and a refractive index of the hard coat layer at a wavelength of 610 nm is 0.05 or less.

7. The optical film according to claim 6,
wherein the base material contains aramid.

8. The optical film according to claim 6,
wherein number of times of folding endurance of the optical film measured by an MIT test machine according to JIS P8115 (2001) is 1000 or more.

9. An optical film comprising:
a base material; and
a hard coat layer,
wherein a refractive index of the base material at a wavelength of 550 nm is 1.60 or more,
wherein a refractive index of the hard coat layer at a wavelength of 435 nm is 1.78 or more and 1.93 or less,
a difference between a refractive index of the base material at a wavelength of 435 nm and a refractive index of the base material at a wavelength of 610 nm is 0.11 or more, and
a peak intensity PV value of a power spectrum obtained by subjecting a reflectivity spectrum of the optical film to fast Fourier transform is 0.3 or less;
wherein the base material and the hard coat layer are in contact with each other,
the hard coat layer contains inorganic particles and a polymer of a monomer having at least one skeleton selected from a fluorene skeleton, a dinaphthothiophene skeleton, a naphthalene skeleton, an anthracene skeleton, a benzotriazole skeleton, a triazine skeleton, a benzophenone skeleton, a merocyanine skeleton, a benzoxazole skeleton, a benzothiol skeleton, a triphenylene skeleton, a cinnamoyl skeleton, a bisphenol S skeleton, and a tolane skeleton,
a difference between the refractive index of the base material at a wavelength of 435 nm and a refractive index of the hard coat layer at a wavelength of 435 nm is 0.05 or less, and
a difference between the refractive index of the base material at a wavelength of 610 nm and a refractive index of the hard coat layer at a wavelength of 610 nm is 0.05 or less.

10. The optical film according to claim 9,
wherein the base material contains aramid.

11. The optical film according to claim 9,
wherein number of times of folding endurance of the optical film measured by an MIT test machine according to JIS P8115 (2001) is 1000 or more.

* * * * *